United States Patent
Traylor

[19]

[11] Patent Number: 6,121,819

[45] Date of Patent: Sep. 19, 2000

[54] SWITCHING DOWN CONVERSION MIXER FOR USE IN MULTI-STAGE RECEIVER ARCHITECTURES

[75] Inventor: Kevin B. Traylor, Austin, Tex.

[73] Assignee: Motorola, Inc., Schaumburg, Ill.

[21] Appl. No.: 09/055,445

[22] Filed: Apr. 6, 1998

[51] Int. Cl.[7] .................................................. G06G 7/12
[52] U.S. Cl. .......................... 327/359; 327/355; 327/113; 455/333
[58] Field of Search .................................... 327/113, 116, 327/355, 359, 357; 455/333, 326

[56] References Cited

U.S. PATENT DOCUMENTS 5,581,210  12/1996  Kimura ..................................... 327/119

Primary Examiner—Dinh T. Le
Attorney, Agent, or Firm—Barbara R. Doutre

[57] ABSTRACT

A mixer circuit (400) for use with a multi-stage receiver (200) accepts a single ended or differential (i.e. balanced) input (401). A voltage to current converter (402) comprised of a single RF transistor coupled to the input (401) provides a single current node (404) having a current proportional to a received input. A switching network (408) employs a plurality of stages (406). Each stage (406) is connected to the current node (404) and further has a control line (A, B, C, D). A clock signal generator connected to the control lines (A, B, C, D) of the switching network stage (406), generates clock signals having a frequency equal to the frequency of the received RF input signal. The switching network (408) under control of the clock signals switches the current at a frequency equal to the frequency of the received RF input signal to generate baseband I and Q signals. If the mixer (500) is differential, the balanced signal inputs (520) will be 180° out of phase, one to another. In addition, the mixer (500) will consist of a first (510) and second (515) switching network. Of importance, only one first (510) and one second (515) switching network stage is active at any instant in time.

12 Claims, 5 Drawing Sheets

SWITCHING DOWN CONVERSION MIXER FOR USE IN MULTI-STAGE RECEIVER ARCHITECTURES

FIELD OF THE INVENTION

This invention generally relates to mixers and particularly to a down conversion mixer circuit for use in a multi-stage receiver architecture, such as, for example, a quadrature receiver.

BACKGROUND OF THE INVENTION

A prevailing trend in today's wireless communications industry is the wholesale integration of radio frequency (RF) transceiver functionality onto a single die. A term frequently used by industry insiders when discussing the topic is the "single chip transceiver." Despite the technical challenges associated with this endeavor, a small school of proponents believe Direct conversion techniques may provide a marketable set of solutions. As will be appreciated by those skilled in the art, Direct conversion refers to techniques whereby an incoming RF signal is received and converted directly to a set of baseband (audio) components without conversion to a set of Intermediate Frequency (IF) components.

In the receiver architecture anticipated above, the down-mixer circuit plays a critical role. It must be fast and support high frequency operation. It must exhibit strong Local Oscillation (LO) isolation characteristics, since the RF signal and the LO reference operate at the same frequency. It should have a low noise figure to improve receiver sensitivity. In addition, it must be energy efficient to help in the war on current drain. Based on the foregoing, it would be extremely advantageous to provide an improved down-mixer circuit and methodology optimized for use in a multi-stage direct conversion receiver.

DESCRIPTION OF THE PREFERRED EMBODIMENT

Figure 1:
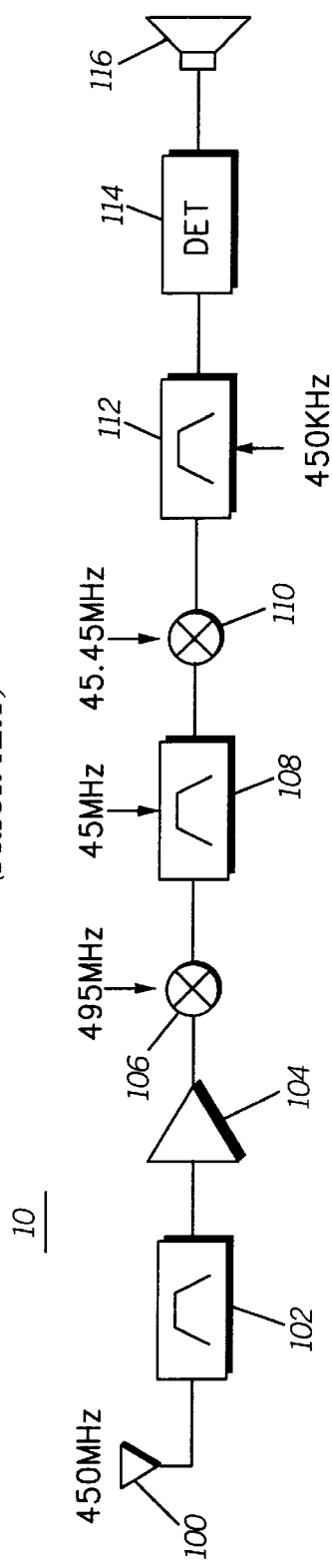
FIG. 1 depicts a prior art receiver architecture utilizing down-mixer circuits in accordance with the art.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, a block diagram of a prior art receiver architecture 10 utilizing a down-mixing circuit as shown. The receiver 10 includes an antenna 100 for receiving radio frequency (RF) signals. By way of example and not by way of limitation, the received RF signal may have a frequency of 450 MHz. The signal is filtered by passive filter 102 and amplified by pre-amp 104. The amplified signal is mixed with a first local oscillator (LO) signal at mixer 106. By way of example and not by way of limitation, the first LO reference may be a 495 MHz signal, the mixing of which with the 450 MHz received signal results in a first Intermediate Frequency (IF) signal of approximately 45 MHz. The first IF signal is filtered by passive filter 108. A second mixing stage 110 mixes the first IF signal with a second LO of 45.45 MHz, the mixing of which with the 45 MHz first IF results in a second IF signal of approximately 450 KHz. This down converted second IF signal is filtered by a second filtering stage 112 and demodulated by detector circuit 114. The detected signal is then communicated to speaker 116.

Figure 2:
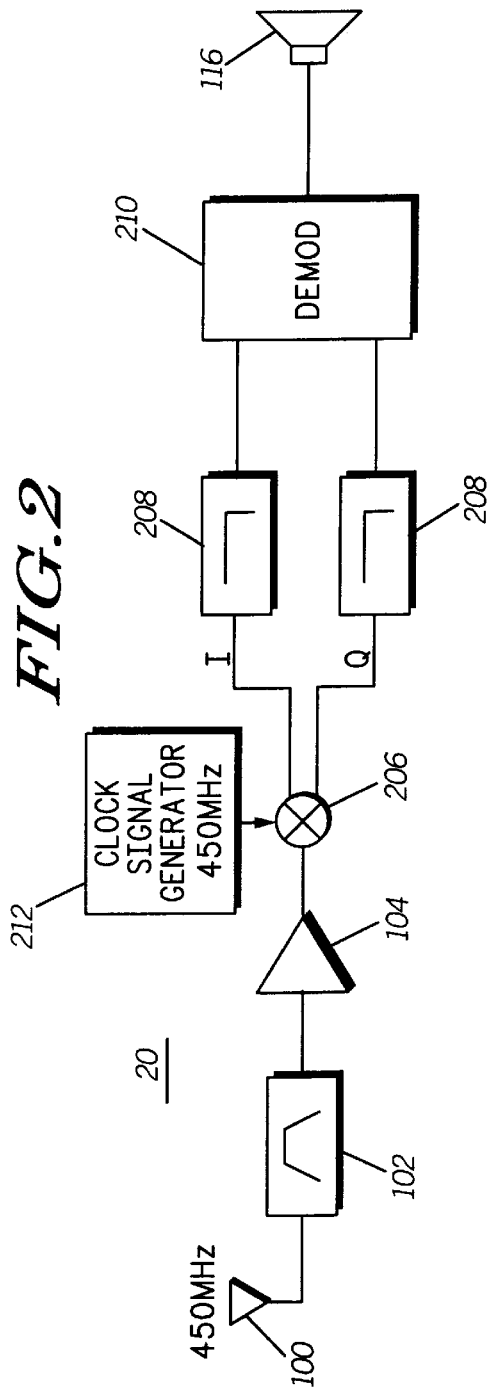
FIG. 2 depicts a direct conversion receiver in accordance with the present invention.

Referring next to FIG. 2, a block diagram of a direct conversion receiver is depicted in accordance with the present invention. The front end of the receiver 20 is similar to the front end of the receiver 10 of FIG. 1. By way of comparison it includes: an antenna 100, passive filter 102 and pre-amp 104. The amplified signal is mixed with a first LO signal clock signal generator 212 at mixer 206. By way of example and not by way of limitation, the first LO reference is a 450 MHz signal, the mixing of which with the 450 MHz received signal results in the generation of baseband I and Q components which are filtered by I and Q baseband filters 208, demodulated by demodulator circuit 210, and then communicated to speaker 116. As will be noted by those skilled in the art, the direct conversion receiver of FIG. 2 does not employ the two stage IF down conversion circuitry of FIG. 1

Figure 3:
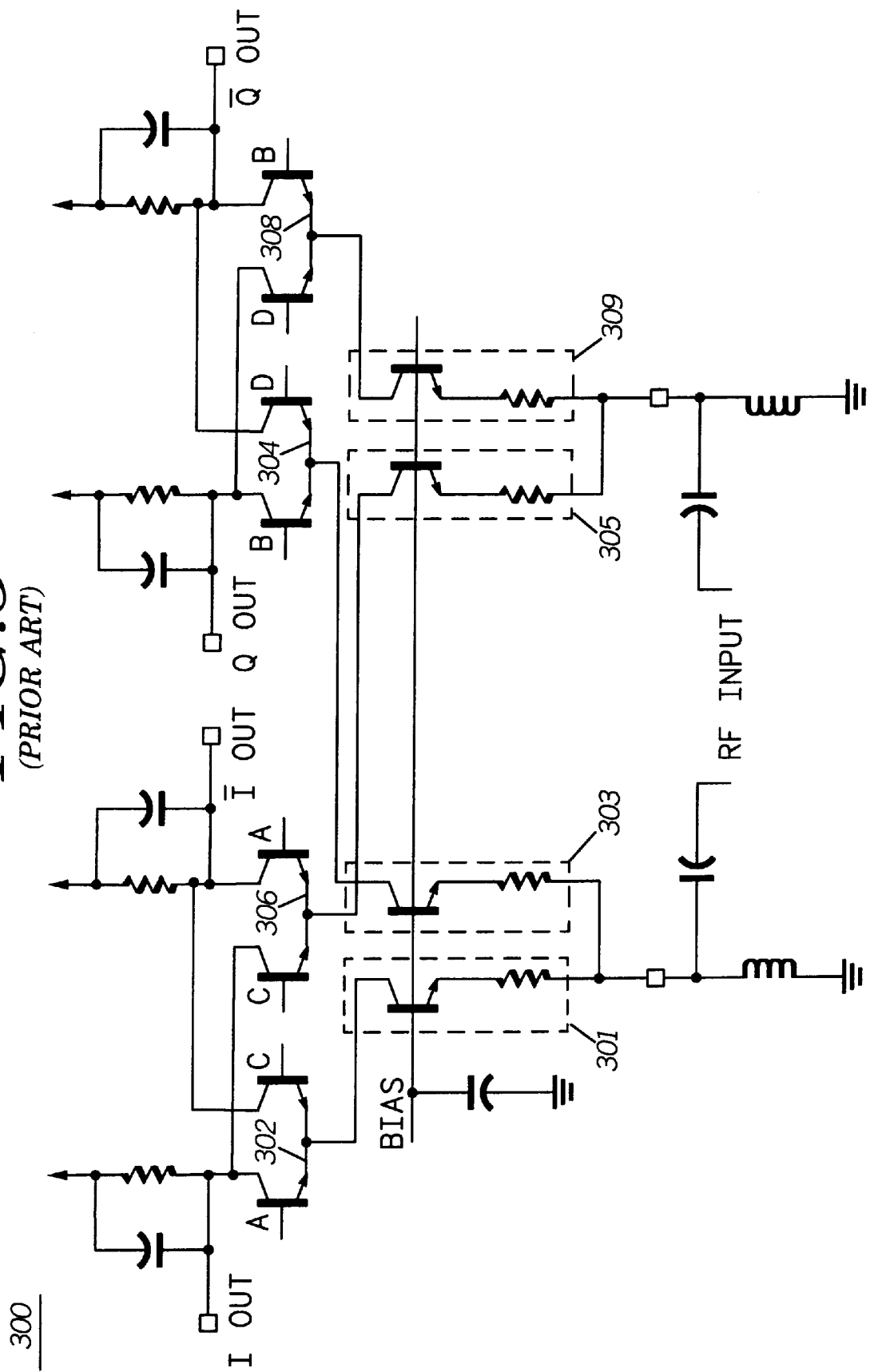
FIG. 3 depicts a detailed circuit block diagram of a prior art Gilbert Cell mixer circuit in accordance with the art.

FIG. 3 depicts a detailed circuit block diagram of a prior art mixer circuit 206 in accordance with the art. Upon close inspection, it will be appreciated by those skilled in the art that the mixer circuit of FIG. 3 is a well known Gilbert Mixer, frequently referred to as a Gilbert Cell Mixer. This type of mixer has frequently been used with the direct conversion receiver 20 of FIG. 2. Notwithstanding, it poses a serious set of limitations when this receiver is integrated onto a single silicon die. First, LO isolation becomes limited to what can be achieved with separations measured in distances of microns. Second, the number of transistors required to generate two baseband quadrature signals increases the current drain demands of the device.

Figure 4:
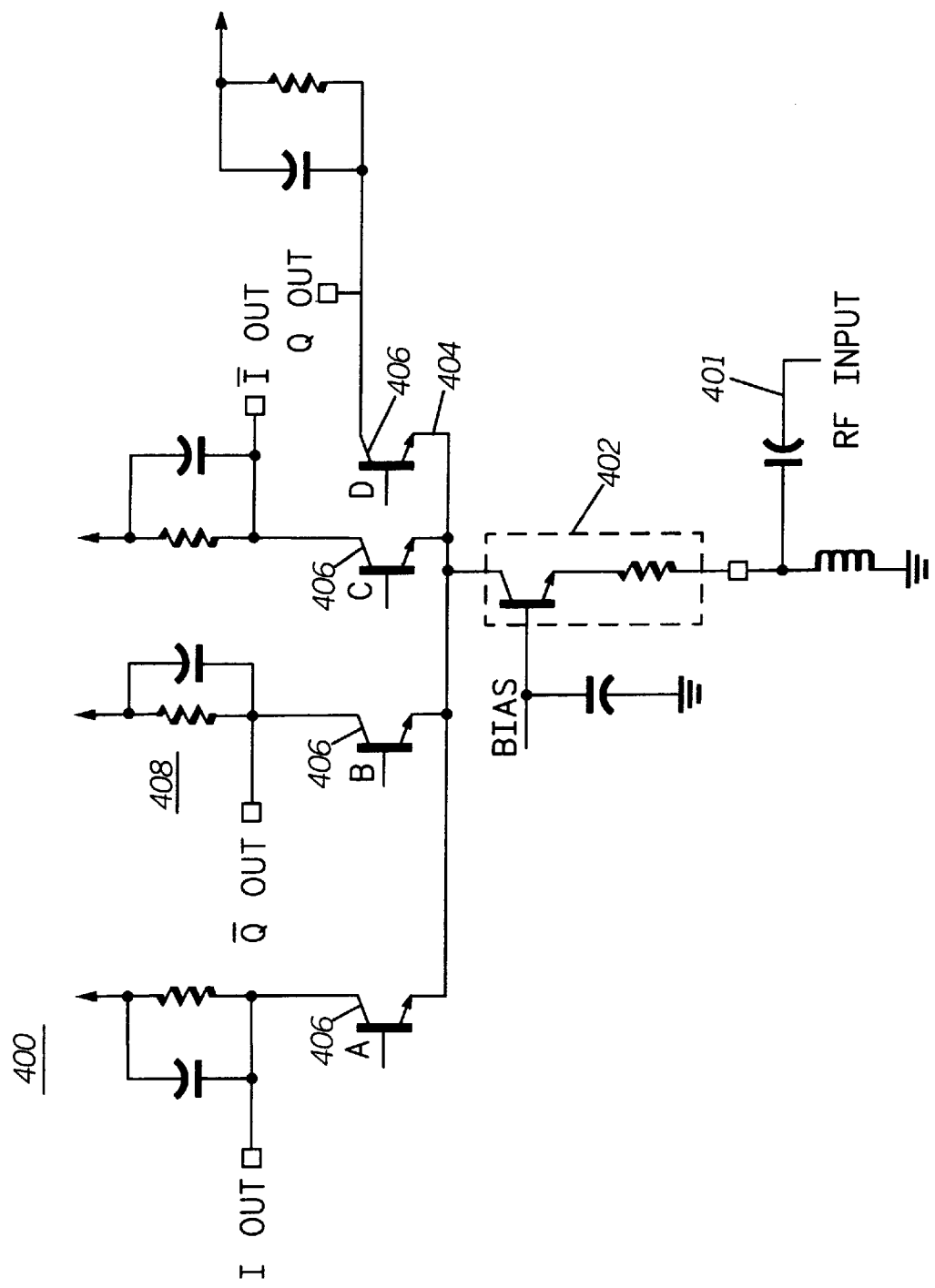
FIG. 4 depicts a detailed circuit block diagram of a switching down conversion mixer circuit in accordance with the present invention.

FIG. 4 depicts a detailed circuit block diagram of a switching mixer circuit in accordance with the present invention. Upon inspection it will be appreciated by those skilled in the art that the mixer 400 of FIG. 4., unlike the mixer 300 of FIG. 3. is a non-differential circuit thereby requiring but a single input path 401. In accordance with the present invention, the mixer 400 includes a single voltage to current converter 402. By way of comparison, the Gilbert Cell mixer 300 of FIG. 3 is a differential circuit, having two parallel input paths, each of which employs two voltage to current converter pairs 301,303 and 305, 309.

Referring back to FIG. 4, the voltage to current converter 402 establishes a single current node 404. By way of comparison, in the Gilbert Cell mixer 300 of FIG. 3 each voltage to current converter pairing 301,303 and 305,307 provides a current node, one within each respective parallel input path.

Referring back to FIG. 4, the mixer 400 employs a switching network 408 comprised of multiple stages. In accordance with the present invention, switching network 408 has four stages, each represented as 406. It will be appreciated by those skilled in the art that other than four stage configurations may be implemented. The number of stages merely determines the number of achievable outputs states. In the present example, the mixer 400 is employed in a quadrature receiver. As such, four output states are required, therefore the switching network 408 employs four stages. If three, six, or eight output stages are deemed advantageous, then the number of switching network stages will necessarily change in order to accommodate the receiver design. Of importance, however, it will be noted that each stage 406 of switching network 408 is connected to the single current node 404.

By way of comparison, the Gilbert Cell mixer 300 of FIG. 3 employs a distributed switching network topology employing four current nodes 302, 304, 306, 308, two within each respective parallel input path. While the mixer 400 of FIG. 4 produces a four state output comprising Iout, $\bar{I}$out, Qout, $\bar{Q}$out, it does so in a far more cost and current efficient manner than the art. Cost efficiency is achieved by the reduced part count between mixer 400 of FIG. 4 and mixer 300 of FIG. 3. Current efficiency is enhanced, in part, by the parts count reduction and, in part, by the non-distributed switching network topology of switching network 408. This point is more readily understood by referring to FIGS. 6 and 7.

Figure 5:
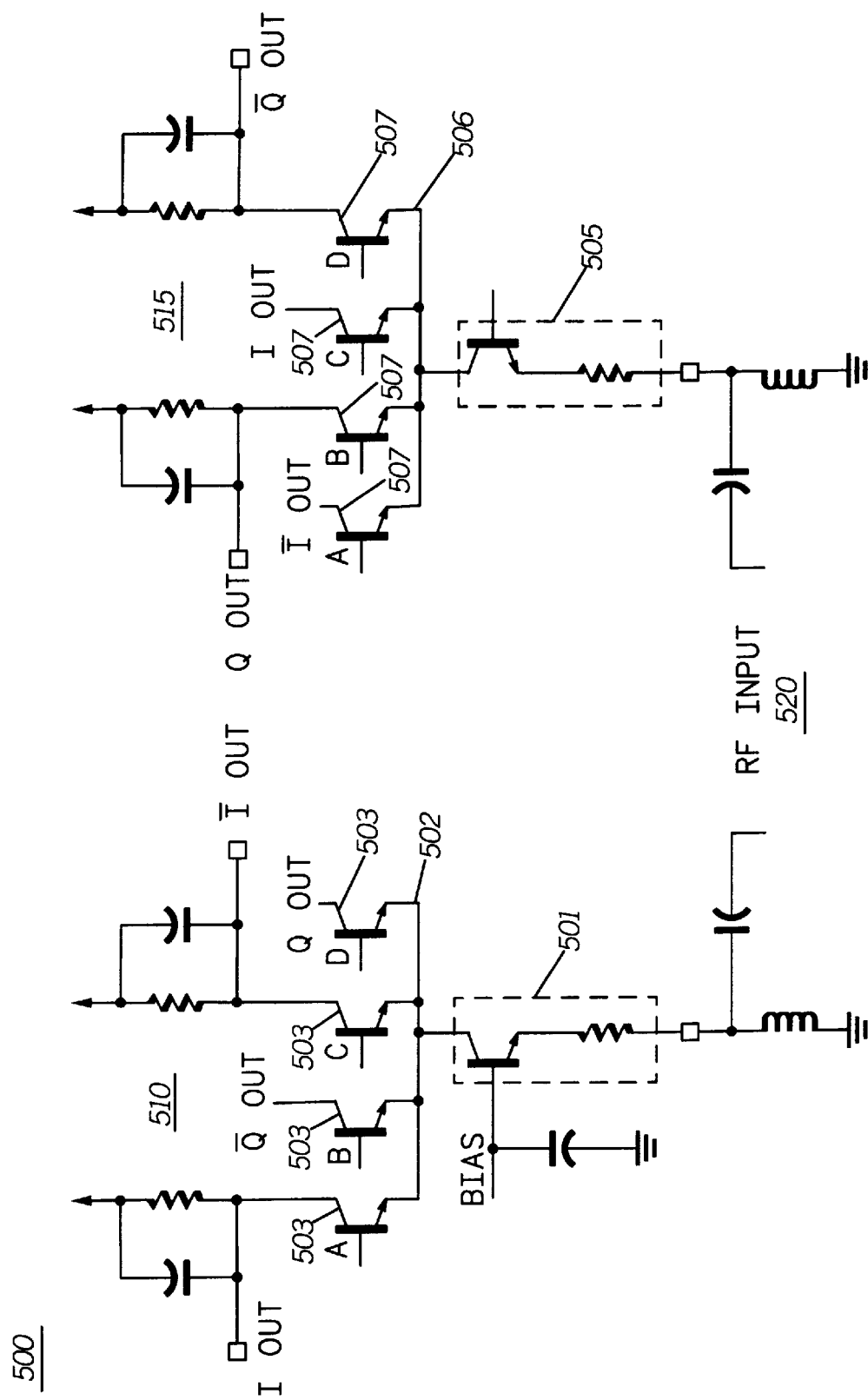
FIG. 5 depicts a detailed circuit block diagram of a second embodiment of the switching mixer circuit of FIG. 4.
Figure 7:
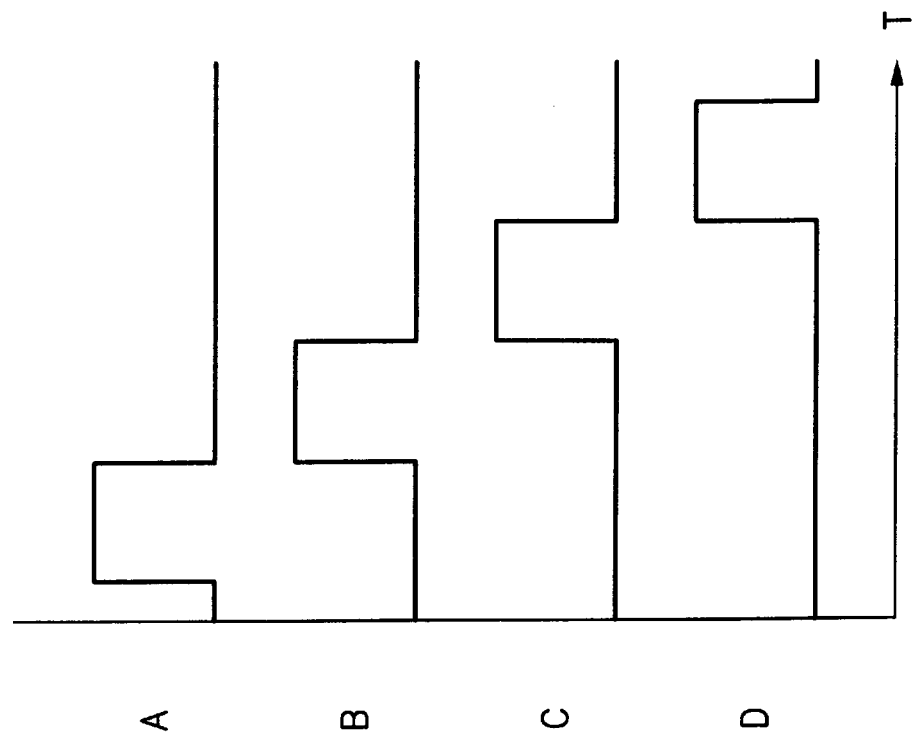
FIGS. 6 and 7 show timing diagrams depicting the operation of the mixer circuit of FIG. 3 and the mixer circuits of FIGS. 4 and 5, respectively.
Figure 6:
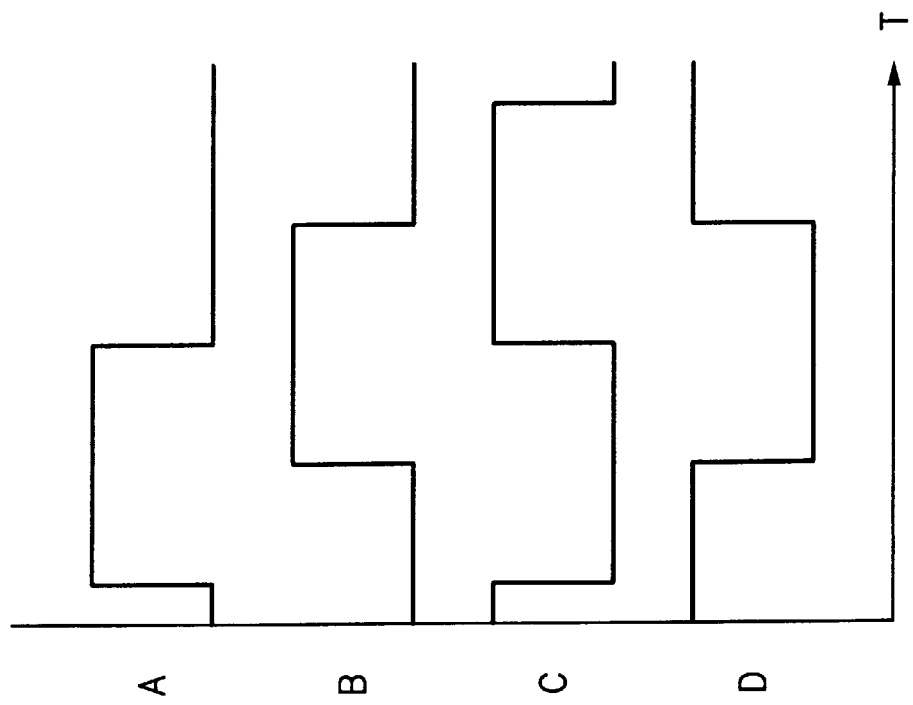

FIGS. 6 and 7 show two timing diagrams depicting the operation of the mixer circuit of FIG. 3 and the mixer circuits of FIGS. 4 and 5, respectively. As will be understood by those skilled in the art, operation of the mixer circuit 300 of FIG. 3 requires that at least two mixing circuit stages be active at any instant in time in order to generate an output state Iout, $\bar{I}$out, Qout, $\bar{Q}$out. By way of comparison, the mixer 400 requires but one mixing circuit stage 406 to be active in order to generate an output state Iout, $\bar{I}$out, Qout, $\bar{Q}$out. The duty cycle of FIG. 7 that controls switching network 408 operation is sourced by the clock signal generator circuit 212 shown in FIG. 2. The clock pulses of FIG. 7 are delivered to selectable control lines designated A, B, C, D and connected to respective stages 406 of the switching network 408. During the presence of a clock signal on a control line A, B, C, or D only the recipient stage 406 is active (i.e., enabled and turned on).

This topology results in a mixing circuit that significantly reduces cost and the current drain requirements of the device into which it is employed. In battery operated, hand-held, consumer electronic, and communications devices such as two-way radios, cellular phones, PCS phones, pagers and the like, this equates to longer battery life and reduced device cost which are two distinct competitive advantages.

FIG. 5 depicts a detailed circuit block diagram of a second embodiment of the switching mixer circuit of FIG. 4. As will be appreciated by those skilled in the art, the mixing circuit 500 of FIG. 5 is a differential embodiment of the circuit 400 disclosed in FIG. 4. As a result it employs parallel input paths. Of importance, it will be noted that each respective input path has but one voltage to current converter 501 and 505. Each input path has but one current node 502 and 506. Each input path has but one switching network 510 and 515. Each switching network is connected to a single albeit respective current node. Of note, during operation, only one switching network stage from each respective switching network 510 and 515 is active at any instant in time.

In summation, the mixer circuits 400 and 500 of the present invention may be characterized as having a single RF transistor, operated in a linear mode, to generate a current that is proportional to the signal strength of a received RF input signal. The output current of this transistor is then fed into a direct conversion switching network. In accordance with the present invention, the switching network is a four stage network which supports the operation of a quadrature receiver.

Within the network, the four stages, each themselves transistors, such as, for example NPN transistors, switch the current into four load resistors which creates two differential baseband signals Iout, $\bar{I}$, Qout, $\bar{Q}$out. The four switching network stages are controlled by clock signals labeled A, B, C, and D whose relationship is shown in FIG. 7. and whose frequency equals to the carrier frequency of the received RF input signal. The switching action of the four stages that generates the two baseband I and Q signals is governed by the following equations:

$$X = \sum_{n=1}^{x} a_n \text{COS}(n\omega_{LO}t) \quad a_n = \frac{4}{n\pi}\text{SIN}\left(\frac{n\pi}{2}\right)\text{COS}\left(\frac{n\pi}{4}\right) \quad 1)$$

$$Y = \sum_{n=1}^{x} b_n \text{SIN}(n\omega_{LO}t) \quad b_n = \frac{4}{n\pi}\text{SIN}\left(\frac{n\pi}{2}\right)\text{SIN}\left(\frac{n\pi}{4}\right) \quad 2)$$

This mixer circuit when fully integrated on an integrated circuit (IC) has several advantages and exhibits superior performance over presently integrated mixers, such as, for example, a Gilbert Cell mixer. By way of example and not by way of limitation, a single RF transistor determines the noise figure of this mixer permitting the design of a less expensive, more robust receiver. A single transistor generates both I and Q baseband signals which greatly reduces the current drain of an incorporating device when compared to the current drain exhibited by a Gilbert Cell mixer. Reduced current drain equates to longer battery life for battery operated communications devices.

Thus, in accordance with the invention, there has been provided a mixer circuit 400 for use with a multi-stage receiver 200 that accepts a single ended or differential (i.e. balanced) input 401. A voltage to current converter 402 comprised of a single RF transistor coupled to the input 401 provides a single current node 404 having a current proportional to a received input. A switching network 408 employs a plurality of stages 406. Each stage 406 is connected to the current node 404 and further has a control line (A, B, C, D). A clock signal generator connected to the control lines (A, B, C, D) of the switching network stage 406, generates clock signals having a frequency equal to the frequency of the received RF input signal. The switching network 408 under control of the clock signals switches the current at a frequency equal to the frequency of the received RF input signal to generate baseband I and Q signals. If the mixer 500 is differential, the balanced signal inputs 520 will be 180° out of phase, one to another. In addition, the mixer 500 will consist of a first 510 and second 515 switching network. Of importance, only one first 510 and one second 515 switching network stage is active at any instant in time.

What is claimed is:

1. A mixer circuit for use within a receiver, comprising:
   an input for receiving a radio frequency (RF) signal;
   a voltage to current converter coupled to the input for providing a single current node; and
   a switching network having multiple stages, each stage being connected to the single current node and each stage having a selectable control such that only one stage is selected at any instant in time to generate baseband I and Q outputs.

2. The mixer circuit of claim 1, further comprising a clock signal generator coupled to the selectable controls.

3. The mixer circuit of claim 2, wherein the clock signal generator generates a single clock signal at said any instant in time.

4. The mixer circuit of claim 2, wherein the clock signal generator is connected to the selectable control of the switching network.

5. A mixer circuit for use with a direct conversion receiver comprising:

an input for receiving a radio frequency (RF) signal;

a voltage to current converter coupled to the input for providing a single current node; and a switching network having multiple stages, each stage being connected to the single current node and each stage having a selectable enable such that only one stage is selected at any instant in time to generate baseband I and Q output signals.

6. The mixer circuit of claim 5, further comprising a clock signal generator coupled to the selectable controls.

7. The mixer circuit of claim 6, wherein the clock signal generator generates a single enable signal at said any instant in time.

8. The mixer circuit of claim 6 wherein the clock signal generator is connected to the selectable control lines of the switching network.

9. A direct conversion receiver including a mixer circuit, said mixer, comprising:

an input for receiving a radio frequency (RF) signal;

a voltage to current converter coupled to the input for providing a single current node;

a switching network having a plurality of stages, each stage connected to the single current node and further having a selectable control line; and a clock signal generator connected to the selectable control line of each switching network stage, such that only one switching network stage is active at any instant in time, the switching network generating baseband I and Q output signals.

10. A communication device including a direct conversion receiver, said direct conversion receiver including:

a voltage to current converter for receiving a radio frequency (RF) input signal and providing a single current node;

a switching network having a plurality of stages, each stage connected to the single current node and further having a selectable control line; and a clock generator connected to the selectable control line of each switching network stage, such that only one switching network stage is active at any instant in time to generate baseband I and Q output signals.

11. A differential mixer circuit for use with a direct conversion receiver, comprising:

a first voltage to current converter for receiving a radio frequency (RF) input and providing a first current node;

a second voltage to current converter coupled to a second input for providing a second current node;

a first switching network having a plurality of stages, each stage of the first switching network connected to the first current node and further having a selectable control line; and a second switching network having a plurality of stages, each stage of the second switching network connected to the second current node and further having a selectable control line; and a clock signal generator connected to the selectable control line of each first and second switching network stage, such that only one first and one second switching network stage is active at any instant in time, the one first or one second active switching network generating baseband I and Q output signals.

12. The differential mixer circuit of claim 11, wherein the RF input is a differential signal having balanced inputs 180° out of phase, one to another.

\* \* \* \* \*